UNITED STATES PATENT OFFICE.

REEVE P. WALLIS, OF OAKLAND, CALIFORNIA.

FLEXIBLE LEAD-PENCIL.

SPECIFICATION forming part of Letters Patent No. 337,466, dated March 9, 1886.

Application filed July 31, 1885. Serial No. 173,177. (No specimens.)

*To all whom it may concern:*

Be it known that I, REEVE P. WALLIS, a resident of Oakland, Alameda county, State of California, have invented a new and useful Elastic Composition for Pencils; and I hereby declare that the following is a full, clear, and exact description of the same.

My invention relates to a composition having an elastic quality for forming pencils and pencil-points suitable for writing and drawing. Pencils made out of my composition are more certain and durable than those made out of the ordinary graphite, or a mixture thereof with clay and iron.

The following description fully explains the nature of my said invention and the manner in which I proceed to form and use the same for the purposes for which it is designed.

In order to get a composition which will have an elastic quality, and at the same time give distinct lines and marks with facility, I employ certain proportions of graphite and caoutchouc. After careful preparation these fundamental ingredients are intimately mixed by trituration, after which the mass is subjected to pressure and rolled into sheets of varying thickness. The sheets are cut to any desired size as to length and thickness, and the pieces inclosed in wooden cases, in the same way as the common pencils. The wood casing may have any usual form—as round or flat, octagonal or convexed. This latter form is adapted for carpentry and the shop generally, and the pencils made for these uses are strong and of extreme length. The elastic composition may be used also for pencil-points in short pieces to be inserted in pencil-cases made of metal or other material.

The proportions of the ingredients forming the elastic composition are varied to give the desired texture, and to produce degrees of hard and soft pencils adapted to the purposes of the desk, the drawing-table, and the work-bench.

I claim that the elastic quality of my compound gives a more certain and durable pencil-point. It is not friable and liable to crumble in the act of writing or pointing, and the point will not break because of a slight blow or a fall from desk or bench, and it is economical as well as useful.

Having thus fully described my invention, what I claim, and desire to secure by Letters Patent, is—

An elastic composition formed of certain proportions of graphite and caoutchouc, for pencils incased in wood, and for pencil-points to be used in cases of metal or other material, substantially as hereinbefore described and set forth.

In testimony whereof I have hereunto set my hand.

REEVE P. WALLIS.

Witnesses:
A. B. SMITH,
S. JOHNSON.